P. DIETZ.
PHOTOGRAPHIC APPARATUS FOR FILMS.
APPLICATION FILED JUNE 28, 1913.
1,110,116.
Patented Sept. 8, 1914.
2 SHEETS—SHEET 2.
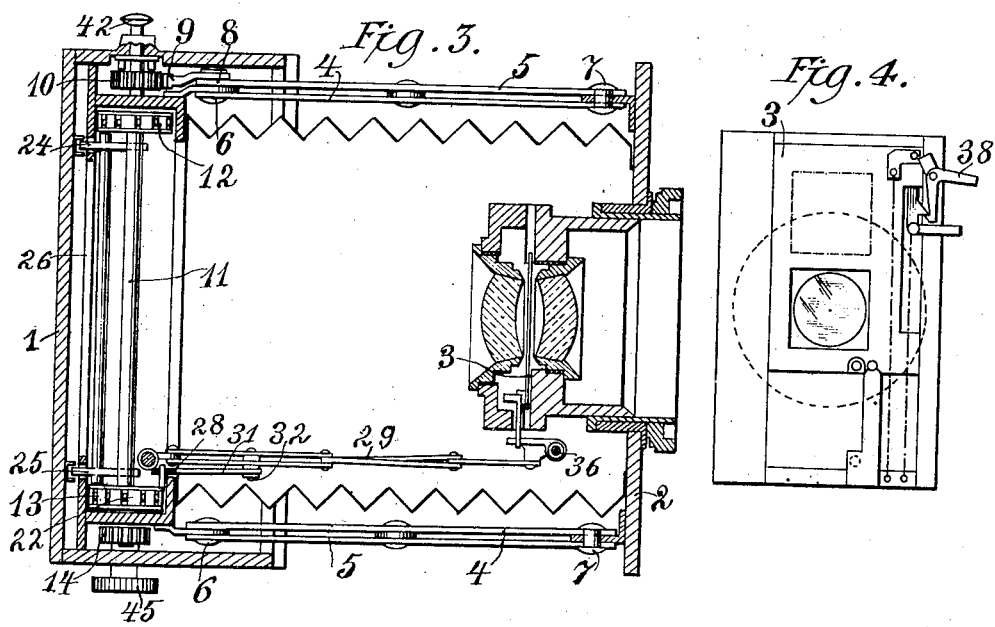
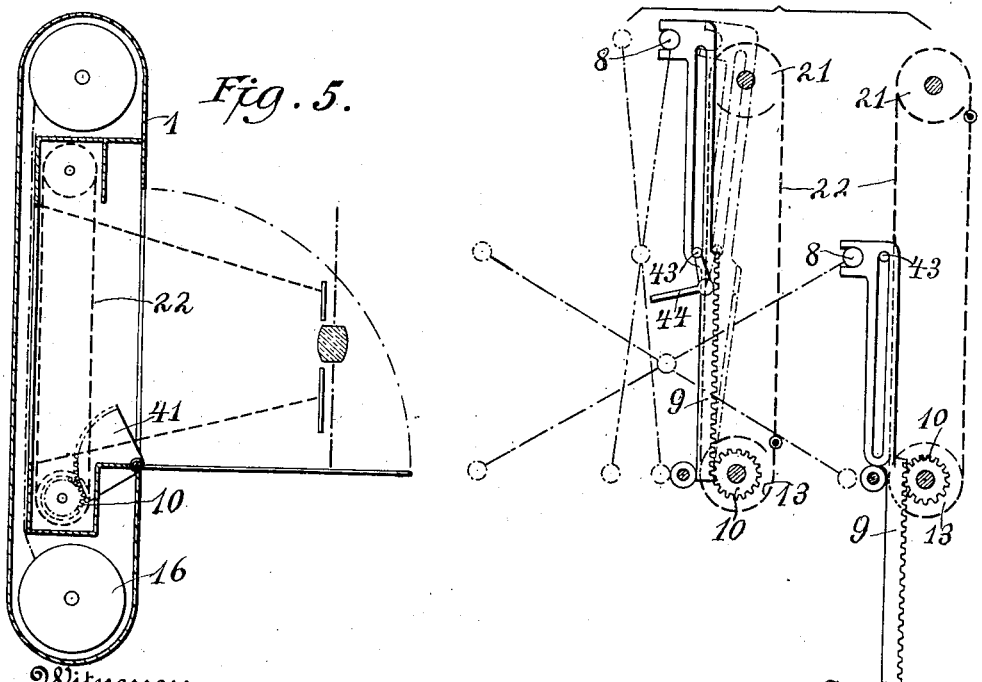

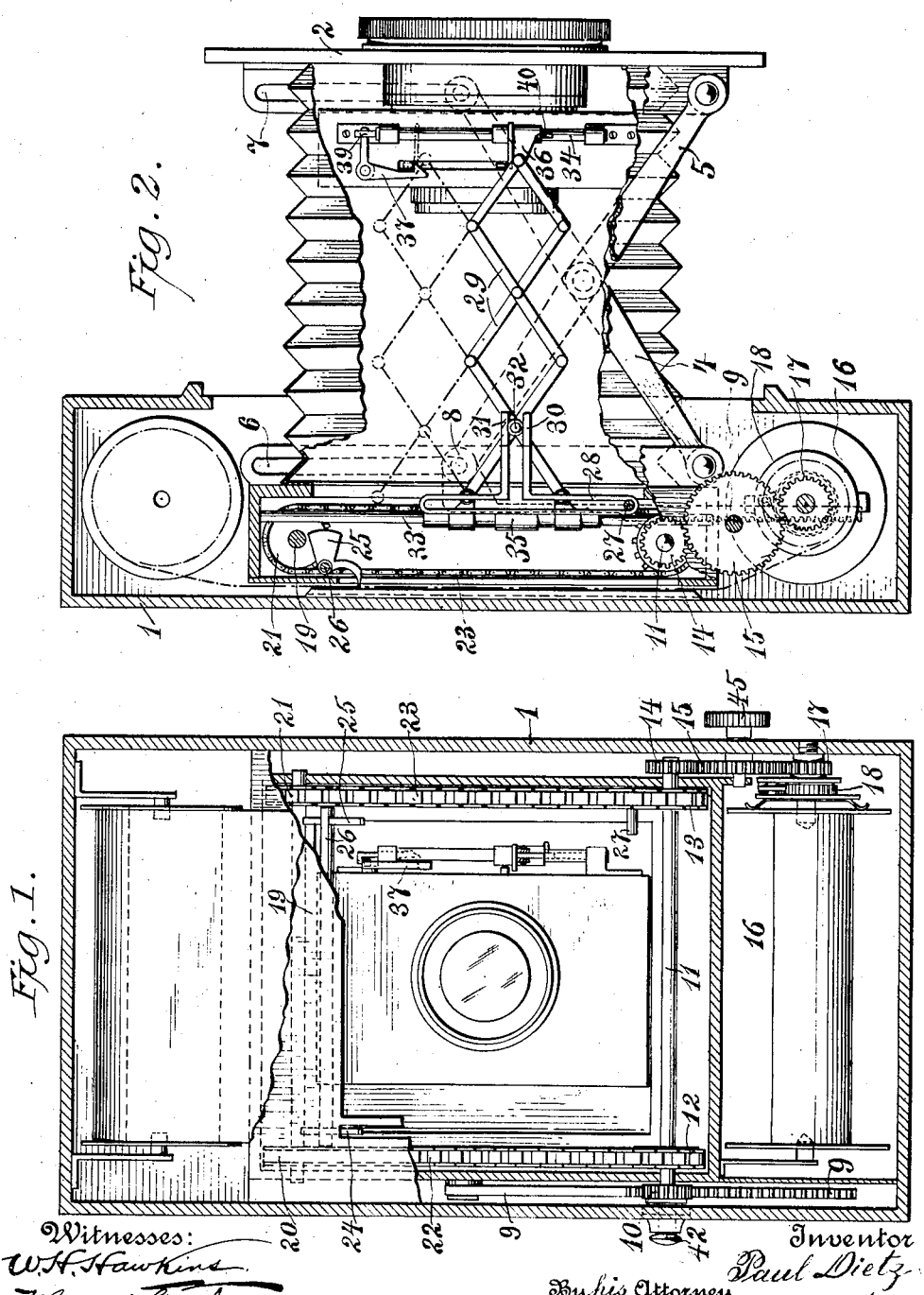

UNITED STATES PATENT OFFICE.

PAUL DIETZ, OF BROOKLYN, NEW YORK, ASSIGNOR TO NEW IDEAS MANUFACTURING COMPANY INC., OF NEW YORK, N. Y.

PHOTOGRAPHIC APPARATUS FOR FILMS.

1,110,116.        Specification of Letters Patent.        Patented Sept. 8, 1914.

Application filed June 28, 1913. Serial No. 776,213.

*To all whom it may concern:*

Be it known that I, PAUL DIETZ, a citizen of the Empire of Germany, and a resident of Brooklyn, county of Kings, and State of New York, have invented certain new and useful Improvements in Photographic Apparatus for Films, of which the following is a specification.

This invention has reference to improvements in photographic apparatus for films.

It pertains particularly to a novel camera which is automatically placed in condition for exposure by one single operation and mechanism is provided for guarding the operator against any mistakes.

In certain cameras of former constructions quite a number of operations have to be performed for the purpose of getting a film portion in position for exposure, tensioning the shutter, etc. If one of these operations was forgotten, for instance, if the film were not moved or if the film was moved and the shutter not tensioned a failure resulted. Sometimes two or three pictures were taken on the same film portion or no exposure was effected at all and film portions were lost and the operator disappointed.

The present invention has for its purpose to produce a camera by means of which the operator is protected against any inattention, oversight, carelessness, or disturbance from other parties, and against the loss of any film portion. In addition to this protective feature, the single operation necessary for placing the camera in condition for exposure renders this novel camera very desirable. Furthermore, if this single operation has not been fully performed no picture can be taken and no loss is incurred. While these various phases of placing the camera in condition for exposure are going on the shutter is also automatically tensioned, all by the same single operation. These main objects have been primarily attained by providing mechanism in connection with the plate carrying the objective which is automatically operated when the objective plate is drawn out and moved in. In addition thereto, means are provided for rendering the entire mechanism inactive and care has been taken to produce a neat apparatus.

In my co-pending application for cameras, Serial Number 726,643, filed October 19, 1910, means in a fixed camera are described, operated by lever mechanism and the shutter moves in proportion to the operation of the lever mechanism. The present invention comprises a lazy tongs mechanism which operates the shutter but exposure may take place only when the lazy tongs mechanism is completely drawn out. Furthermore, in the present invention the shutter does not operate at all until the entire new film portion is in the exact desired position. The former fixed camera can not be unfolded while the protective and guard mechanism of the present invention is operated by the drawing out of the unfolding part of the camera.

In order to render the invention entirely clear reference is had to the accompanying drawings in which:

Figure 1 represents in rear sectional elevation a photographic apparatus embodying in desirable form the present improvements. Fig. 2 is a longitudinal cross-section with drawn out objective plate. Fig. 3 is a top sectional plan view of part of the mechanism. Fig. 4 illustrates in detail view the shutter mechanism. Fig. 5 shows in modified form the film operating mechanism. Fig. 6 shows in partial elevation a modified form of the mechanism for releasing the film moving device.

Similar characters of reference denote like parts in all the figures.

In the drawing, 1 represents the casing which normally houses the entire mechanism. It is immaterial for the present invention whether the shutter is mounted before, between or in the rear of the lenses, or in a focal plane. In the accompanying drawings the shutter is shown to be located between the lenses and in Fig. 4 a shutter of the leaf type is represented. The shutter is protected against premature release until the new film is in the desired position. Any exposure of a partially moved film is entirely impossible and the shutter can not be released until the movable objective mechanism of the camera is in the proper position, that is, until it is set for infinite distance.

As previously mentioned, the setting of the entire camera mechanism requires but a single operation. While the objective plate 2 is drawn out the entire protective and operative mechanism is actuated. In Figs. 1, 2 and 3 the camera is shown ready for taking a picture. For exposure it then requires simply the release of the shutter 3, after a picture has been taken the camera is closed and by closing the same the exposed portion of the film is moved and wound upon a reel and a new portion of the film unwinds from another reel and is brought before the opening. At the same time the shutter is tensioned for the next exposure.

The objective plate 2 is connected with the camera by a lazy tongs connection as shown in Figs. 2 and 3. This connection comprises an arrangement of bars similar to toggle levers 4, 5. These are pivotally connected in the center and permanently, but movably secured in the lower frame portions, while the two opposite free ends are adapted to move in slots 6 and 7. The end portion 8 of the lever 5 is shown to be in its lowest position in Fig. 2 when the camera is open. When the camera is closing this end portion performs an ascending motion in the slot 6. A toothed rack 9, Figs. 1, 2 and 3, is coupled with the end portion of the lever 5, which rack engages a pinion 10. This pinion, by its motion rotates the shaft 11. The shaft 11 rotates two chain or similar wheels 12, 13 mounted thereon. Another gear 14 is mounted on the shaft and rotated thereby engaging an adjoining gear 15 which in turn drives the automatic film rolling-up mechanism 16, comprising a gear 17 and a cog-wheel 18. This mechanism is adapted to roll up the film in but one direction. Above the shaft 11 and above the film opening there is a like second shaft 19 provided with two guide rings and chain or similar wheels 20, 21 around which move the chains 22, 23 or perforated metal bands. The chains or perforated metal bands 22, 23 are provided each with a gripper 24, 25 which are advantageously mounted upon a connecting rod 26. The chain 23 further is provided with a pin 27 on its inner portion which is located between the chain wheels 13, 21 and faces the shutter. This pin 27 reaches into a slotted bar 28 which is connected with an auxiliary lazy tongs mechanism 29 and moves the same when the slotted bar 28 ascends. The slotted member 28 has two horizontal side bars 30, 31 and the neighboring joint of said auxiliary lazy tongs mechanism is provided with a fixed button 32, that travels in the bars 30, 31 which act as a guide for the said button. This arrangement insures a perfectly horizontal movement of the auxiliary lazy tongs mechanism. In order to mount this auxiliary movable lazy tongs link 29, two tubes, 33, 34 are provided of which the tube 33 is secured to the casing 1 and the tube 34 to the shutter frame. The tube 33 carries a sleeve 35 adapted to move thereon. The open ends of the auxiliary lazy tongs mechanism are secured to said sleeve 35 and the united opposite ends of the lazy tongs are connected to the sleeve 36, provided on the tube 34. In Fig. 3 of the drawing, in which the objective plate mechanism is shown to be drawn out, the sleeves 35, 36 are in their lowest position. Upon closing the camera the lazy tongs link 29 and the pin 27 move freely without any further effect until the pin 27 has reached the top end of the slot 28, whereupon the sleeves 35, 36 are raised and during the ascending motion of the sleeve 36 it pushes up the shutter 3 thereby tensioning the same for the next exposure. During this operation the chains 22, 23 move around the chain wheels 13, 21. The grippers 24, 25 descend with the chain and move the film which was exposed and the lower mechanism winds it upon the reel. The grippers 24, 25 are each provided with a pointed curved arm which pierces the film and carries it along. This occurs while the pin 27 ascends and tensions the shutter. Assuming that the camera is now closed and a new picture shall be taken, then the objective plate is drawn out and the mechanism moves in the opposite direction as compared with the closing of the camera, but without performing positive work. The grippers 24, 25 ascend now and move freely over the film. The pin 27 descends, when it has reached its lowest position in the slot 28 then the sleeve 36 releases a safety lever 37 so that the tensioned shutter can be operated by means of the shutter release lever or button 38. If the pin 27 has not yet reached its lowest position and someone attempts to operate the shutter by the lever device or button 38, then no release can take place and the shutter is guarded against premature release. To prevent premature or involuntary release of the shutter, the sleeve 36 is hollowed out at its bottom end and the tube 34 has a short longitudinal slot. A rod 39 is permanently but movably located within the tube 34 and carries a pin 40 that travels in the short slot of the tube 34. When the lazy tongs link 29 descends it touches, during the phase of movement, the pin 40 and moves the rod 39 down whereby the safety lever 37 is released and sets free the shutter which then is to be operated by the release lever or button 38.

For the purpose of rendering it possible to apply the desired mechanism to cameras having a hinged front plate, the toothed rack 9 hereinbefore described is replaced by a toothed segment 41 whereby the entire mechanism may be actuated in the same manner as when the rack is operated by drawing out the objective plate.

Certain circumstances may make it desirable to move part of the mechanism independently. To render this possible a coupling 42 is provided, shown in Figs. 1 and 3. This coupling is adapted to release the gear 10 with the head shaft 11. A special construction of a coupling is shown in Fig. 6. The end portion 8 of the lever 5 descends vertically and takes along the toothed rack 9 which is connected with the gear 10. The toothed rack slides on a pin 43 mounted on a movable lever. The rack 9 is movable on the pinion 10 and when the lever 44 is moved in an upward direction then the toothed rack is shifted sidewise, as shown in dotted lines, to the left in Fig. 6. The pin 8 is then disconnected and moves freely without affecting the moving mechanism of the film. The left portion of Fig. 6 shows the camera in a closed condition. The right portion of Fig. 6 shows the pin 8 in its lowest position which is the case when the camera is open.

It is evident that the rack 9 has always the same amount of movement in one size of apparatus. The single members of the auxiliary lazy tongs link likewise are of the same length in a certain size of apparatus. For other sizes these elements may be of greater or smaller size. The pinion 10 may have more or less teeth according to the size of the apparatus.

When the mechanism is in the exact position so that a new film portion is before the opening and the shutter is tensioned then the final adjustment for distance is effected by means of a spiral device on the front plate of the objective mechanism. The spiral mounting of the focal adjustment is of usual construction.

The coupling is desirable in this camera for the purpose of preventing the loss of any portion of the film. If an automobile, for instance, appears to approach the operator and suddenly turns and disappears the operator may desire to close the camera without taking a picture. The operator then releases the coupling to prevent the motion of the film whereupon he may close the camera. When another object then shall be photographed later on, the objective plate is simply moved out and the new picture may be taken on the film portion still in position. Now the coupling is operated to make the entire mechanism again movable, or the coupling may be directly operated when the objective plate has been drawn out. The entire mechanism may also be operated by means of a button 45 or lever connected with the gear 15, or with the shaft 11, or on the upper shaft 19.

I claim as my invention:

1. A photographic apparatus for films, consisting of partly stationarily mounted and partly movable mechanism composed of rigid elements comprising an intermediate connection adapted to place the entire mechanism in condition for exposure by the single operation of drawing out the movable mechanism thereof, and moving a full film portion by returning said movable mechanism.

2. A photographic apparatus for films, consisting of partly stationarily mounted and partly movable mechanism composed of rigid elements, comprising a movable objective plate, and an extensible intermediate connection between the said mechanism and objective plate adapted to place the entire mechanism in condition for exposure by the single operation of completely moving in the mechanism and drawing out the objective plate.

3. A photographic apparatus for films, consisting of partly stationarily mounted and partly movable mechanism composed of rigid elements, comprising a movable objective plate, an extensible intermediate connection between the said mechanism and objective plate adapted to place the entire mechanism in condition for exposure by the single operation of completely moving in the mechanism and drawing out the objective plate, and means for preventing exposure until the objective plate has been completely drawn out.

4. A photographic apparatus for films, consisting of partly stationarily mounted and partly movable mechanism composed of rigid elements, comprising a movable objective plate, means in connection with said mechanism and objective plate for placing the camera in condition for exposure by completely pushing in and drawing out the objective plate, means for rendering inactive the mechanism for placing the camera in position for exposure, and means for moving a complete film portion when said mechanism is inactive.

5. A photographic apparatus for films, consisting of partly stationarily mounted and partly movable mechanism composed of rigid elements, comprising means for placing a new film portion before the opening, a movable objective plate on the camera, means in connection with said mechanism and objective plate adapted to place the camera in condition for exposure by the single operation of pushing in and drawing out the objective plate, and means for preventing exposure of the new film portion until the objective plate has been completely drawn out.

6. A photographic apparatus for films, consisting of partly stationarily mounted and partly movable mechanism composed of rigid elements, comprising means for moving a film portion, a shutter, and means for tensioning the same, a movable objective plate on the camera, means connecting said mechanism and objective plate adapted to place the entire mechanism in position for exposure by completely pushing in and drawing out said plate, and means preventing the release of the shutter until the plate is completely drawn out.

7. A photographic camera for films, consisting of mechanism for placing the camera in condition for exposure comprising a movable objective plate with side frame portions having each a slot in the upper portion, two similar frames in the sides of the camera with slotted upper portions, a lazy tongs connection secured with one lower end on the plate frame and with the other on the frame in the camera and having free top ends adapted to move in the slots of the frames, and mechanism in connection with the moving inner top ends of the levers to move the film, and mechanism in connection with the top ends of the other levers to tension the shutter when the camera is closing.

8. In a photographic camera for films, a movable objective plate with side frame portions having a slot in its upper portion, a side frame within the camera with corresponding slot in its upper portion, a lazy tongs connection comprising two pivotally connected levers, one lever having one bottom end movably secured to the plate frame and the other to the frame in the camera, the free end of the first lever being adapted to travel in the slot of the frame in the camera and the top end of the second lever in the slot of the plate frame, a toothed rack coupled with the free end of the first lever, a pinion with shaft engaged by the rack, a gear on the second end of the pinion shaft and gears engaged thereby with a cog-wheel for actuating the film rollin-up mechanism in but one direction.

9. In a camera, a movable objective plate with frame having a slot in its upper portion, a side frame within the camera with corresponding slot, a shutter housing with shutter therein, within the camera, a lazy tongs connection comprising two pivotally connected levers, one lever having one bottom end movably secured to the plate frame and the other to the frame in the camera, the free end of the first lever being adapted to travel in the slot of the frame in the camera and the top end of the second lever in the slot of the plate frame, an auxiliary lazy tongs link, and means in connection with the latter for pushing up the shutter when the camera is closing thereby tensioning said shutter.

10. In a camera, a movable objective plate with frame, a shutter housing with shutter on said plate, a lazy tongs connection between the camera and objective plate, a rack operated thereby, a pinion with shaft rotated by the rack, chain wheels with chains operated by the pinion shaft, a pin on the inner chain portion facing the objective plate, and means actuated by the pin for raising and thereby tensioning the shutter.

11. In a camera, an objective plate with frame, a shutter housing with shutter on said plate, a lazy tongs connection comprising an auxiliary lazy tongs link, a tube with slot and movable sleeve on the shutter frame to which one end of the lazy tongs link is connected, a rod in said tube with pin extending through the slot, a like tube and sleeve supporting the opposite ends of the lazy tongs link, chain wheels operating the lazy tons connection, a pin on the inner portion facing the objective plate, a slotted member in which said pin travels, said pin raising the auxiliary lazy tongs link when the camera is closing, together with the sleeves to which it is connected, and raising thereby the shutter tensioning the same.

12. In a camera, an objective plate, a lazy tongs connection between said plate on the camera, rack and chain wheel mechanism operating the lazy tongs connection when closing the camera, grippers on the chain portions facing the rear of the camera, a pointed curved lever on each gripper adapted to pierce the film and move it into position before the opening.

13. In a camera, mechanism for placing the apparatus in condition for exposure, comprising a movable objective plate, a lazy tongs connection between said plate and said mechanism, a toothed rack operating said lazy tongs mechanism, gears and chain wheels actuated by said rack, film moving mechanism operated thereby, mechanism for automatically tensioning the shutter, and mechanism preventing the release of the shutter until the objective plate has been completely drawn out.

14. In a camera, a movable front plate, mechanism for placing the camera in condition for exposure comprising a movable objective plate, an intermediate connection, a toothed member operated by the said connection, and mechanism for moving a full film portion and tensioning simultaneously the shutter operated thereby.

Signed at New York, N. Y., this 27th day of June, 1913.

PAUL DIETZ.

Witnesses:
 MARIE LEAHY,
 SAM M. CURRAN.